Sept. 22, 1970   J. DEROUBAIX   3,529,861
RESILIENT BUMPER
Filed Dec. 22, 1967   2 Sheets-Sheet 1
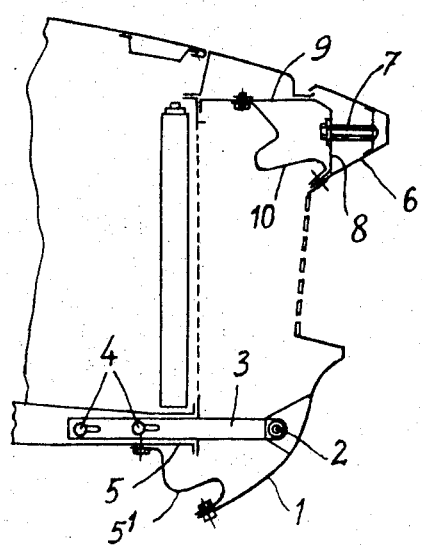
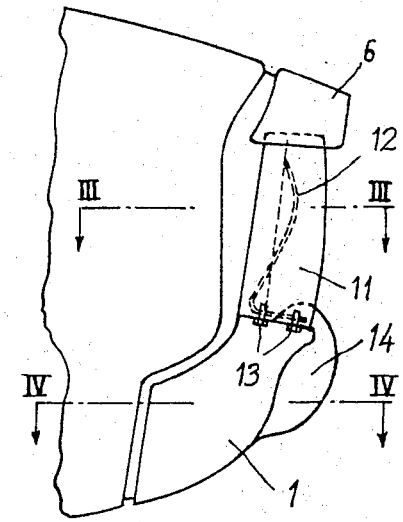
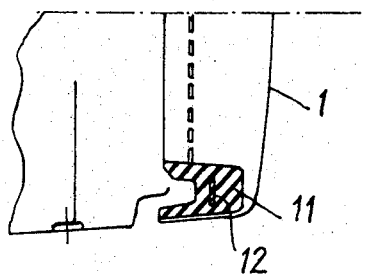
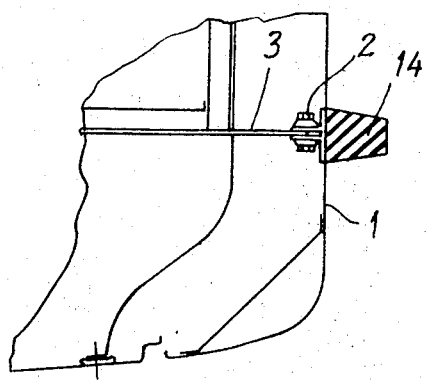
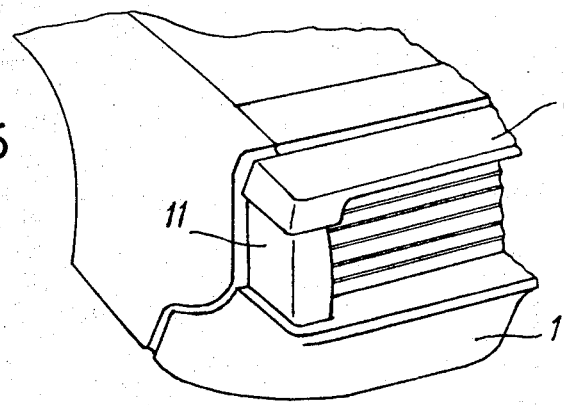

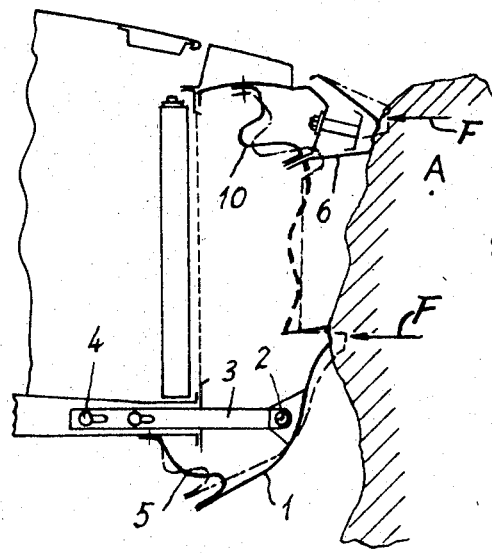
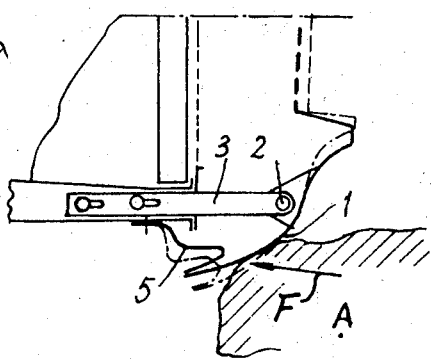
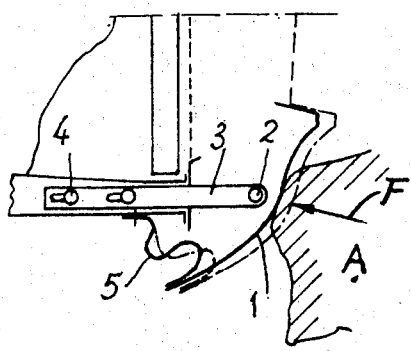
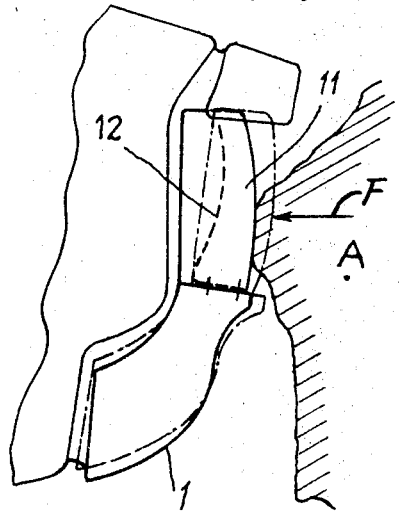
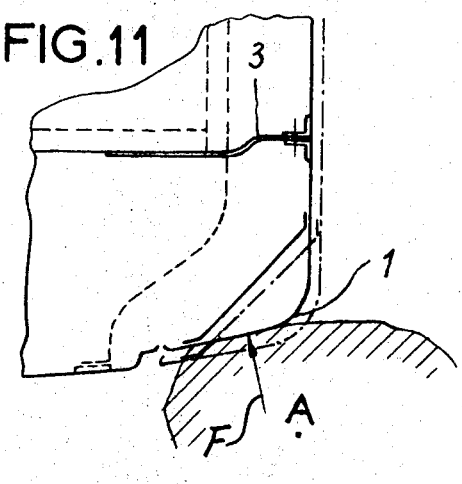
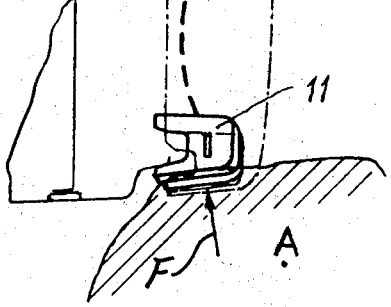

United States Patent Office 3,529,861
Patented Sept. 22, 1970

3,529,861
RESILIENT BUMPER
Jacques Deroubaix, Billancourt, France, assignor to Regie Nationale des Usines Renault, Billancourt, France, and Automobiles Peugeot, Paris, France
Filed Dec. 22, 1967, Ser. No. 692,978
Claims priority, application France, Dec. 30, 1966, 89,458
Int. Cl. B60r 19/08; B61f 19/04
U.S. Cl. 293—63     6 Claims

ABSTRACT OF THE DISCLOSURE

Bumper for motor vehicles, characterised in that it comprises four main elements, i.e. an upper element, a lower element and a pair of lateral elements consisting of yielding material and disposed between and at the ends of said upper and lower elements. The lower elements are made of a suitably shaped sheet-metal and are pivotally mounted on, for frictional engagement with, a pair of arms adapted to be distorted and to slide on the frame of the vehicle in case of shock. The lower element is connected to the vehicle frame by means of flexible and deformable members or only deformable members. The upper element is also made of a suitably shaped sheet-metal secured to a deformable cross member reinforced by flexible and deformable members or only by deformable members.

---

This invention relates to bumpers for motor vehicles and has specific reference to an automobile bumper designed with a view to absorb the energy developed by accidental shocks by causing the distortion of certain component elements of the bumper in order to reduce the damage to essential body components such as fenders, bonnet, etc.

The bumper according to this invention consists of four main elements, i.e. a lower element, an upper element and a pair of flexible or yielding lateral elements disposed between and at the ends of said lower and upper elements. The lower element is made of suitably shaped sheet material and is mounted for frictional pivoting movement on deformable blades adapted to slide along the vehicle frame in case of shocks. The lower element is further connected to the frame by means of flexible and deformable blades or only deformable blades, the upper element also made of suitable shaped sheet material secured to a deformable cross member reinforced by flexible and deformable blades or only deformable blades.

In order to afford a clearer understanding of this invention and of the manner in which the same may be carried out in practice, reference will now be made to the attached drawings illustrating diagrammatically by way of example a typical form of embodiment of the bumper constituting the subject-matter of this invention.

In the drawings:
FIG. 1 is a side elevational and fragmentary view of the front of a motor vehicle, wherein some of the bumper component elements are shown in section;
FIG. 2 illustrates a side elevational view similar to FIG. 1 showing more particularly the lateral elements;
FIGS. 3 and 4 are sections taken respectively upon the lines III—III and IV—IV of FIG. 2;
FIG. 5 is a perspective view showing one portion of the front of the vehicle equipped with the bumper of this invention;
FIG. 6 shows the manner in which the bumper takes up the impact when there is contact between the surface A and the upper element and the lower element above the pivot axis of the lower element;
FIG. 7 shows the manner of taking up blows when there is contact of the surface A with the lower element below the axis of articulation of the lower element;
FIG. 8 shows the arrangement when there is contact of the surface A with a lateral element;
FIG. 9 shows contact of the surface A with the lower element at the level of the pivot pin;
FIG. 10 shows contact of the surface A with the lateral element; and
FIG. 11 shows contact of the surface A with the lower element.

Referring to the drawings and more particularly to FIGS. 1 to 5 thereof the bumper according to this invention consists of four main elements, as follows:

(a) A lower element 1 consisting for example of a suitably shaped sheet-metal strip extending throughout the width of the vehicle body and pivotally mounted on, for frictional engagement with, a pair of longitudinally movable, transversely fixed arms 3 by means of suitable pivot means 2 so as to be capable of rotating about these pivot means and cause said arms to recede by sliding backward in case a predetermined force is exerted longitudinally thereagainst, said arms 3 being mounted to this end on the frame of the vehicle by using friction washers 4 and bolts extending through slots formed longitudinally in said arms. The lower portion of said element 1 is connected to the main longitudinal member 5 of the vehicle frame by means of flexible and deformable, or only deformable members $5^1$;

(b) An upper element 6 also consisting of a suitably shaped sheet-metal strip extending throughout the width of the vehicle and secured by means of bolts 7 to the vertical wing 8 of a deformable grille-forming cross member 9 reinforced by flexible and deformable members or only deformable members 10, this upper element normally tending to tilt or rotate when certain shocks are exerted thereagainst; and (c) A pair of lateral elements 11 interposed between said lower element 1 and upper element 6, said lateral elements consisting of a flexible material reinforced by a resilient strip 12 and secured to said lower element 1 by low shear-strength bolts 13.

The operation of the above-described bumper will be better understood from the following description of FIGS. 6 to 11 showing various types of shocks likely produced when driving, the surface engaged by the bumper during each shock being designated by the reference letter A, and the force exerted on the bumper by the reference arrow F.

In FIG. 6 the surface A strikes the upper element 6 of the bumper, as well as the lower element 1 above the pivot point 2; as a consequence thereof:
The lower element 1 is tilted upwards or counterclockwise as seen in the figure and the arms 3 are pulled outwards;
The upper element 6 is tilted downwards or clockwise as seen in the figure, while compressing the members 10.

In FIG. 7 the surface A is struck by the lower element 1 beneath the pivot axis 2; therefore:
The lower element 1 is tilted or rotated clockwise, as seen in the figure, and the members 5 are compressed or crushed.

In FIG. 8 the surface A engages one of the lateral elements 11:
The yielding material and the strip 12 are compressed;
The lower element 1 is rotated upwards, thus pulling the members 5 outwards.

In FIG. 9, the surface A engages the lower element 1 at the level of the pivot pins 2:
The arms 3 recede while in frictional contact at 4;
The members 5 are compressed.

In FIG. 10, a lateral contact takes place between the surface A and one of the lateral elements 11:

The element 11 is tilted inwardly, possibly until the fastening bolts 13 are sheared.

In FIG. 11, a lateral contact takes place between the surface A and the lower element 1:

The arms 3 are deflected and bent laterally in parallel.

Of course, the bumper illustrated in the drawing as mounted at the front end of a vehicle is also applicable to the rear portion thereof. Besides, overriders 14 may also be mounted on the lower element 1.

In addition, various modifications and variations may be brought to the specific form of embodiment shown and described herein without departing from the scope of the invention as set forth in the appended claims.

I claim:

1. A bumper for motor vehicles comprising an upper element, a lower element, a pair of lateral elements disposed between and at the ends of said upper and lower elements, a pair of arms mounted on the vehicle's frame for longitudinal movement only, said lower element being made of shaped sheet metal and being pivotally mounted on said arms, a deformable member connecting said lower element to the vehicle's frame, said upper element being made of shaped sheet metal, a second deformable member connecting said upper element to the vehicle's frame, and said lateral elements consisting of yieldable material.

2. A bumper according to claim 1 further comprising flexible reinforcing strip means mounted within the yieldable material of said lateral elements.

3. A bumper according to claim 1 wherein said yieldable material is rubber.

4. A bumper according to claim 1 further comprising shear-strength bolts connecting said lateral elements to said lower element.

5. A bumper according to claim 1 further comprising at least one bumper guard mounted on said lower element.

6. A bumper according to claim 5 wherein at least one said bumper guard is formed of rubber.

References Cited

UNITED STATES PATENTS

| | | | |
|---|---|---|---|
| 2,633,379 | 3/1953 | Kraeft | 293—63 X |
| 2,953,409 | 9/1960 | Barenyi | 293—63 X |
| 3,326,590 | 6/1967 | Wilfert | 293—98 X |
| 3,427,063 | 2/1969 | Taylor | 293—89 X |

ARTHUR L. LA POINT, Primary Examiner

H. BELTRAN, Assistant Examiner

U.S. Cl. X.R.

293—64, 71, 81, 89, 98